Patented Aug. 7, 1934

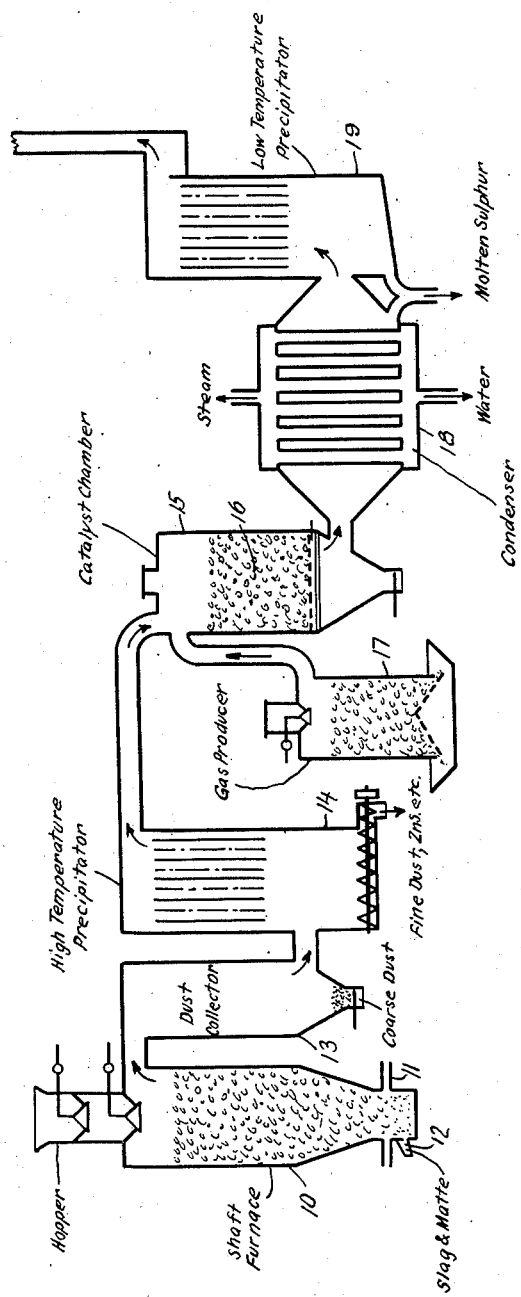

1,969,021

UNITED STATES PATENT OFFICE 1,969,021

PYRITIC SMELTING AND RECOVERY OF SULPHUR

Nils Erik Lenander, Lokken Verk, Norway, assignor, by mesne assignments, to Texas Gulf Sulphur Company, Houston, Tex., a corporation of Texas Application May 21, 1932, Serial No. 612,861
In Germany February 19, 1932

17 Claims. (Cl. 75—62)

In the smelting of pyritic sulphide ores in a shaft furnace into which air is blown, part of the sulphur will distill off in the furnace if the temperature of the ore is sufficiently high, and this sulphur can, if it be protected from oxidation in the furnace and at the exit therefrom, be condensed and recovered by cooling of the gases. At the bottom of the furnace, the ore is exposed to the influence of the blast which, supposing the air does not contain any surplus of a reducing agent such as coke, will have a strong oxidizing influence on the metal sulphides of the ore with the result that these sulphides are oxidized and heat is generated in considerable quantities. The sulphur of the sulphides is oxidized more or less completely to sulphur dioxide which will ascend in the furnace together with other gases such as $N_2, O_2$ and also $CO_2$ and CO which may be formed if carbonaceous material is present. If the ascending hot sulphur dioxide is brought in contact with a reducing agent, it is comparatively easily reduced to form elemental sulphur.

It has been proposed in the smelting of sulphur-bearing ores in a shaft furnace for the recovery of the larger part of the sulphur contents, to charge with the ore such a quantity of a solid reducing agent as may be required for the reduction of the sulphur dioxide formed by the blast in the furnace. Under such conditions of operation, a portion of the sulphur reduced in the lower part of the furnace where the temperature is high (800° C. or more) combines with the carbonaceous reducing agent to form organic sulphur compounds such as carbon disulphide and carbon oxysulphide. If the reducing agent contains hydrogen, or the blast is damp, hydrogen sulphide will also be formed.

The sulphur compounds thus produced escape with the furnace gases and remain with the waste gases after the condensation of the sulphur, lowering the sulphur recovery and necessitating an expensive treatment of the gases from the furnace, as these can not as a rule be discharged into the atmosphere.

To avoid such inconveniences, it has been proposed to regulate the addition of the reducing agent so that only a part of the sulphur dioxide formed by the blast is reduced in the furnace, and, after the gases have left the furnace, to cause the unreduced sulphur dioxide to react with the organic sulphur compounds and the hydrogen sulphide for the formation of elemental sulphur. In this way, it has been possible to remove these sulphur compounds to a great extent, but not completely, as the reactions, especially between $SO_2$ and $H_2S$, are reversible. It is also a rather difficult matter to regulate the quantity of the added reducing agent so that the gases leaving the furnace contain a quantity of $SO_2$ equivalent to the other sulphur compounds, especially if the composition of the ore varies or the working conditions of the furnace change for some reason or other, and a most careful supervision is consequently required.

The present invention contemplates the provision of a process for smelting sulphur-bearing ores, especially such as contain pyrites, in a shaft furnace to recover sulphur by means of which the aforementioned inconveniences may be eliminated.

To this end, the smelting is done in a shaft furnace provided with a closed throat, and a reducing agent is added only in the amount required for carrying out the smelting operation without any interruptions, and for combining with the oxygen introduced by the blast which is not consumed through oxidation of the metal sulphides in the lower part of the furnace, and with the oxygen that may be liberated through reactions in the furnace, forming carbon dioxide and carbon monoxide.

To the gases from the furnace, which contain, besides the sulphur distilled off in the upper part of the furnace, the larger part of the sulphur dioxide formed in the lower part of the furnace by the oxidation of the sulphur metals by means of the air introduced, is added a suitable reducing agent, preferably containing carbon monoxide (for instance producer gas) which is capable of reducing the sulphur dioxide to elemental sulphur. The resulting mixture of gases is treated to effect the reduction of the sulphur dioxide and subsequently cooled to condense the elemental sulphur produced.

The smelting is done in a shaft furnace provided with a closed throat, that is, a charging device which allows the charge to enter the furnace while substantially preventing the ingress of air. The charge consists essentially of ore, a suitable amount of fluxing material, and a solid carbonaceous reducing material, for instance coke.

The solid carbonaceous material is provided to facilitate the smelting, to generate the heat that may be required and to combine with the oxygen of the blast that is not consumed through oxidation of the metal sulphides at or above the tuyères. The quantity of reducing agent necessary for these purposes varies somewhat with the composition of the ore, the size of the ore lumps, and the size and working of the furnace. For a pyritic ore with 40-45% sulphur, additions of 3-4% of reducing agent have given favorable results under normal conditions. In order to have an even heating of the charge above the focus where the oxidation and smelting takes place and to prevent the formation of channels in the charge through which oxygen from the blast can pass to the upper part of the furnace and burn the sulphur there, the size of the ore lumps charged should not be too large. For the same reason, the charge should contain only a moderate quantity of fine material. The combustion of the sulphur in the furnace may also be prevented to a great extent by providing a charge in which the reducing agent and ore are intimately mixed, as, in such case, the oxygen ascending in the furnace from the focus will more easily combine with the reducing agent.

If the reducing agent contains hydrogen or hydrocarbons, hydrogen sulphide is formed, and, since, as hereinbefore pointed out, it can be reduced to elemental sulphur only in an incomplete way, it escapes with the gases from the furnace that are discharged into the atmosphere. The reducing agent should therefore have a low hydrogen content. Bituminous coal containing considerable quantities of volatile constituents effects the formation of considerable hydrogen sulphide, and it is for this reason rather unsatisfactory for the process. Anthracite coal is better, but the best results are obtained when employing coke or charcoal produced at a high temperature.

The smelting is done substantially in the same way as in the usual pyritic or semi-pyritic smelting. As no more blast should be introduced than the quantity required for burning the metal sulphides at the tuyères and the small quantity of the reducing agent, the volume of blast needed is smaller than that employed in the usual pyritic smelting. For a pyritic ore with 40-45% S, 800-1000 m³ (cubic meters) per ton of ore has proved to be sufficient. The blast pressure should preferably be somewhat lower than in the usual pyritic smelting process to further reduce the possibility of passing through the charge an oxygen-bearing gas capable of oxidizing the sulphur distilled off in the upper part of the furnace.

The smelting of a cuprous iron pyrite to which coke has been added may be carried out as follows:

The pyrites-bearing material, mixed with the coke, and flux if necessary, is charged through the closed throat at the top of the furnace. The entering charge is heated in the upper portion of the furnace by the hot gas current ascending in the furnace to a temperature at which one sulphur atom is distilled off (a temperature of 500-800° C.). In this way, approximately half of the sulphur is driven off. The sulphur thus liberated is recovered in the manner described below. Further down in the furnace, the charge, increasing in temperature as it progresses downwardly, comes into contact with the hot gases formed at the focus and ascending in the furnace, and the oxygen that has not been consumed in the smelting at the focus combines with the coke. If more coke is present than is required for the elimination of the oxygen, parallel with this reaction some sulphur dioxide may be reduced to elemental sulphur of which a small part through the influence of the coke forms carbon disulphide, and alternatively carbon oxysulphide. The latter reactions, however, do not occur to any considerable extent and, in carrying out the operation, an effort is made to avoid them as far as possible by adding only such a quantity as is required for satisfactory elimination of the oxygen. It may be found convenient to add a small surplus of coke to make sure that all the oxygen, whether originating from the surplus in the blast or from reactions that may have taken place in the furnace, is in fact removed from the gases. When the charge arrives at a place in the furnace immediately above the tuyères it consists, besides of gangue, principally of metal sulphides, of which iron sulphide is the most important, and it is practically free from coke. Here it is exposed to the influence of the blast, and a pure pyritic smelting takes place, i. e. the larger part of the sulphur and iron is oxidized to sulphur dioxide and ferrous oxide which latter combines with the flux present to form a slag. The sulphur not oxidized combines with the copper in the ore and the iron that has not been oxidized to form a matte which is tapped off in a known manner. The furnace gas escaping from the upper part of the furnace at a temperature of about 400° C. without coming in contact with any air, contains, besides nitrogen and carbon dioxide, about half of the sulphur content of the ore in the form of elemental sulphur and slightly less than the half as sulphur dioxide. In addition small quantities of carbon disulphide and carbon oxysulphide, and, if the coke contains hydrogen or the charge is damp, hydrogen sulphide may also be found in the gases. In order to recover sulphur from the sulphur dioxide, the gases, the elemental sulphur of which may have been primarily condensed, are made to pass at a temperature of about 400° C. to a chamber filled with a suitable catalyst into which a gas containing carbon monoxide, such for example, as producer gas is introduced. The sulphur dioxide is then reduced to elemental sulphur. Bauxite and other metal oxides may be employed as catalysts, as described in my United States Patent No. 1,860,585 and United States patent to Benner et al No. 1,741,551. The small quantities of organic sulphur compounds that may be present in the furnace gas, under the influence of the catalyst combine with the sulphur dioxide forming elemental sulphur. Hydrogen sulphide also combines with sulphur dioxide, but in a very incomplete way in view of the fact that the reaction is reversible, and the gases issuing from the catalytic chamber will consequently contain some hydrogen sulphide in case the furnace gases entering the catalytic chamber contain this gas. If the reducing gas contains hydrogen or hydrocarbons, these are converted in the presence of the catalyst to hydrogen sulphide, which, as already stated remains to a great extent unchanged after passing through the catalytic chamber. For this reason, the producer gas, if such is used as reducing agent, should be produced from materials of low hydrogen content, for instance coke or charcoal. It has been found that the catalyst influence is highly strengthened if the gases are submitted to an electrostatic treatment for instance in a Cottrell apparatus before passing to the catalytic chamber. It is, therefore, advantageous to submit either the furnace gases or the gas containing carbon monoxide or both to an electrostatic treatment before introducing them into the catalytic chamber.

The reduction of the sulphur dioxide can also be effected at higher temperatures without the use of a catalyst. At temperatures of about 700° C. to 800° C. the reaction will occur rapidly and completely in the absence of a catalyst. In this case, an electrostatic treatment of the gases before they are made to react will not give such great advantages, and this treatment can consequently be omitted without any serious inconvenience.

In order to get a reducing gas with a high content of carbon monoxide, if producer gas is employed, the gas producer should be operated at as high a temperature as possible, and it is desirable or necessary to so conduct the operation that the ash constituents will melt to a liquid slag which may be tapped off in a molten condition. Such an operation will also give a very hot producer gas which is a great advantage, as the reduction of the sulphur dioxide should be carried out at a high temperature, in the absence of a catalyst.

After the sulphur dioxide has been reduced, with or without the influence of a catalyst, the treated gases now containing elemental sulphur, originating in part from the furnace process if this sulphur has not been condensed before the catalytic treatment, and in part from the reduction in the catalyst chamber, are introduced into a cooler or condenser maintained at a temperature below the boiling point of sulphur, where, through the cooling of the gas, the sulphur is condensed and a large part is immediately separated from the remaining non-condensible gases. It is preferable to regulate the condensing temperature in such a way that the sulphur is obtained in a liquid state and in a fluid form, so that it can be easily drawn off from the cooler or condenser. For this purpose the cooling surfaces during the condensing operation are kept at a temperature between 120° C. and 160° C., within which limits liquid sulphur, as is well known, is fluid, whereas it is viscous at temperatures above 160° C., and consequently, if the condensation is carried out at a temperature above this limit, will stick to the cooling surfaces and can only be removed from the cooler or condenser with great difficulty.

To keep the condensing temperatures between these limits will not present any difficulties, even if the quantity of gases passing through the cooler should vary considerably, if the cooling surfaces are surrounded by closed chambers for cooling liquors provided with one or more regulating valves for steam. Through regulation of the steam leaving these chambers, suitable pressures and temperatures in the chambers can be easily maintained and the condensing temperature can be kept substantially constant. In order to insure the recovery of substantially all of the sulphur, the gases leaving the cooler or condenser may be treated in an electric precipitator, or a combination cooler or condenser and electrical precipitator may be employed for treating the gases in the first instance.

The process is also applicable to the treatment of sulphide ores containing arsenic. If such an ore is smelted in the above described way, part of the arsenic escapes with the sulphur distilled off in the upper part of the furnace. The remaining arsenic is oxidized to arsenic trioxide and leaves with the furnace gases. During the course of the reduction of the sulphur dioxide by means of carbon monoxide, the arsenic trioxide is reduced, and the reduced arsenic is recovered with sulphur as a sulphur arsenic compound in the subsequent condensation operation.

A diagrammatic representation of apparatus which may be employed in carrying out the process of the invention is shown in the accompanying drawing.

The charge to be smelted is introduced into a shaft furnace 10 provided with suitable means at the top for introducing charge without admitting large volumes of air into the furnace and provided with tuyères 11 for introducing an oxidizing gas and a discharge outlet 12 for slag and matte. Gases from the shaft furnace are conducted to a dust collector 13 which removes coarse dust particles and thence to a high-temperature electrostatic precipitator 14 in which the fine dust particles are removed. The substantially dust-free gases pass from the high temperature precipitator to a catalytic chamber 15 provided with a porous bed of granular bauxite 16. At their point of entry into the catalytic chamber the gases from the precipitator are mixed with producer gas from the gas producer 17. The mixture of gases passes downwardly through the bed of catalyst 16. During the course of passage of the mixture of gases through the catalyst bed, the carbon monoxide and sulphur dioxide contained in the mixture react to produce elemental sulphur. The gases from the catalytic chamber, containing the elemental sulphur in vapor form, are conducted to a condenser 18 in which the hot gases are passed in heat exchange relationship with cooling liquor and cooled to a temperature below the boiling point of sulphur. The cooled gases are passed through a low-temperature electrostatic precipitator 19 to recover the mechanically entrained sulphur particles. Molten sulphur withdrawn from the low-temperature precipitator may be cast in any suitable form or otherwise treated to produce a suitable commercial product.

I claim:—

1. In a smelting process involving the treatment of a charge comprising a mixture of metal sulphide ore and a solid reducing agent in a shaft furnace having a closed throat and provided with tuyères for the introduction of an air blast, the improvement which comprises providing an amount of reducing agent in the charge sufficient and not substantially in excess of that required to combine with excess oxygen introduced by means of the air blast, thereby to avoid the reduction of any substantial amount of sulphur dioxide formed by reaction of the oxygen of the air blast with the metal sulphide, and withdrawing from the furnace a gaseous product containing a substantial amount of sulphur dioxide.

2. In a smelting process involving the treatment of a charge comprising a mixture of metal sulphide ore and a solid reducing agent in a shaft furnace having a closed throat and provided with tuyères for the introduction of an air blast, the improvement which comprises regulating the amount of reducing agent in the charge and the amount of air introduced by the blast to effect substantially complete oxidation of the reducing agent by means of free oxygen introduced by the blast and to effect substantially complete consumption of the free oxygen of the blast, thereby to avoid reduction of any substantial amount of sulphur dioxide produced during the course of the operation and to avoid the passing of gases containing any substantial amount of free oxygen upwardly from the charge, and withdrawing from the furnace a gaseous product containing a substantial amount of sulphur dioxide.

3. In a smelting process involving the introduction of an air blast into the lower portion of a shaft furnace having a closed throat containing a charge comprising pyrites-bearing material, and the maintenance of temperatures sufficiently high to effect distillation of one atom of sulphur from the pyrites in the upper part of the furnace and the oxidation of the resulting ferrous sulphide in the lower part of the furnace to form sulphur dioxide, the improvement which comprises providing the reducing agent in the charge in an amount not substantially in excess of that required to consume any excess oxygen introduced with the air blast and not required for the production of sulphur dioxide, controlling the operation to effect substantially complete consumption of the free oxygen introduced by the blast and to avoid the reduction of any substantial amount of the sulphur dioxide produced, and withdrawing from the furnace a gaseous product containing a substantial amount of sulphur dioxide together with elemental sulphur equal to about one half the amount present in the pyrites of the charge.

4. In a smelting process involving the treatment of a charge comprising a mixture of arsenic-bearing pyrites and a solid reducing agent in a shaft furnace having a closed throat and provided with tuyères for the introduction of an air blast, the improvement which comprises regulating the amount of reducing agent in the charge and the amount of air introduced by the blast to effect substantially complete oxidation of the reducing agent by means of free oxygen introduced by the blast and to effect substantially complete consumption of the free oxygen of the blast, thereby to avoid reduction of any substantial amount of sulphur dioxide or arsenic trioxide produced during the course of the operation and to avoid the passing of gases containing any substantial amount of free oxygen upwardly through the charge, and withdrawing from the furnace a gaseous product containing a substantial amount of sulphur dioxide.

5. In a smelting process involving the introduction of an air blast into the lower portion of a shaft furnace having a closed throat and containing a charge comprising a solid reducing agent and arsenic-bearing pyrites, and the maintenance of temperatures sufficiently high to effect distillation of one atom of sulphur from the pyrites in the upper part of the furnace and the oxidation of the resulting ferrous sulphide in the lower part of the furnace to form sulphur dioxide and an oxide of arsenic, the improvement which comprises providing the reducing agent in the charge in an amount not substantially in excess of that required to oxidize any excess oxygen introduced with the air blast and not required for oxidation of the ferrous sulphide and the production of sulphur dioxide and an oxide of arsenic, controlling the operation to effect substantially complete consumption of the free oxygen introduced by the blast and to avoid the reduction of any substantial amount of the sulphur dioxide and arsenic oxide produced, and withdrawing from the furnace a gaseous product containing a substantial amount of sulphur dioxide together with elemental sulphur equal to about one half the amount present in the pyrites of the charge.

6. The method of smelting pyrites-bearing material which comprises introducing a charge comprising the pyrites-bearing material and a solid reducing agent into a shaft furnace having a closed throat and provided with tuyères for the introduction of an air blast, controlling the operation of the furnace to effect the distillation of elemental sulphur in the upper part and the production of sulphur dioxide in the lower part, regulating the addition of reducing agent to the charge to provide an amount not substantially in excess of that required to combine with the oxygen of the air blast not required for the production of sulphur dioxide, thereby to effect substantially complete consumption of the free oxygen in the gases passing upwardly through the charge and to avoid reduction of any substantial amount of the sulphur dioxide produced, withdrawing from the furnace a gaseous product containing a substantial amount of sulphur dioxide together with elemental sulphur equal to about one half the amount present in the pyrites of the charge, and treating the gaseous product to recover the sulphur contained therein.

7. A process according to claim 6, in which a substantially hydrogen-free carbonaceous reducing agent is employed in the smelting operation.

8. A process according to claim 6, in which the gaseous product is subjected to the action of carbon monoxide to reduce the sulphur dioxide contained therein.

9. A process according to claim 6, in which the gaseous product is cooled to condense the sulphur vapor contained therein, and the remaining gases are subjected to the action of carbon monoxide to reduce the sulphur dioxide contained therein.

10. A process according to claim 6, in which the gaseous product is subjected to an electrostatic treatment and the thus treated gases are subjected to the action of a reducing agent to reduce the sulphur dioxide contained therein.

11. A process according to claim 6, in which the gaseous product is subjected to an electrostatic treatment and to the action of a reducing agent simultaneously to reduce the sulphur dioxide contained therein.

12. The method of smelting arsenic-bearing pyrites which comprises introducing a charge comprising the pyrites and a solid reducing agent into a shaft furnace having a closed throat and provided with tuyères for the introduction of an air blast, controlling the operation of the furnace to effect the distillation of elemental sulphur in the upper part and the production of sulphur dioxide and arsenic trioxide in the lower part, regulating the addition of reducing agent to the charge to provide an amount not substantially in excess of that required to combine with the oxygen of the air blast not required for the production of sulphur dioxide and arsenic trioxide, thereby to effect substantially complete consumption of the free oxygen in the gases passing upwardly through the charge and to avoid reduction of any substantial amount of the sulphur dioxide or arsenic trioxide produced, withdrawing from the furnace a gaseous product containing elemental sulphur and elemental arsenic and substantial amounts of sulphur dioxide and arsenic trioxide, and treating the gaseous product to recover the sulphur and arsenic contained therein.

13. A process according to claim 12, in which a substantially hydrogen-free carbonaceous reducing agent is employed.

14. A process according to claim 12, in which the gaseous product is subjected to the action of carbon monoxide to reduce the sulphur dioxide and arsenic trioxide contained therein.

15. A process according to claim 12, in which the gaseous product is cooled to condense the sulphur vapor contained therein, and the remaining gases are subjected to the action of carbon monoxide to reduce the sulphur dioxide and arsenic trioxide contained therein.

16. A process according to claim 12, in which the gaseous product is subjected to an electrostatic treatment and the thus treated gases are subjected to the action of a reducing agent to reduce the sulphur dioxide and arensic trioxide contained therein.

17. A process according to claim 12, in which the gaseous product is subjected to an electrostatic treatment and to the action of a reducing agent simultaneously to reduce the sulphur dioxide and arsenic trioxide contained therein.

NILS ERIK LENANDER.